United States Patent
Stecik

(10) Patent No.: US 10,743,738 B2
(45) Date of Patent: Aug. 18, 2020

(54) GRATE CLEANING DEVICE

(71) Applicant: Kirk Stecik, Colliers, WV (US)

(72) Inventor: Kirk Stecik, Colliers, WV (US)

(*) Notice: Subject to any disclaimer, the term of this patent is extended or adjusted under 35 U.S.C. 154(b) by 79 days.

(21) Appl. No.: 15/895,669

(22) Filed: Feb. 13, 2018

(65) Prior Publication Data
US 2018/0228339 A1     Aug. 16, 2018

Related U.S. Application Data

(60) Provisional application No. 62/458,081, filed on Feb. 13, 2017.

(51) Int. Cl.
| | |
|---|---|
| *A47L 13/34* | (2006.01) |
| *A47L 17/00* | (2006.01) |
| *A47L 13/06* | (2006.01) |
| *A47J 37/07* | (2006.01) |
| *B08B 1/00* | (2006.01) |

(52) U.S. Cl.
CPC .......... *A47L 13/34* (2013.01); *A47J 37/0786* (2013.01); *A47L 13/06* (2013.01); *A47L 17/00* (2013.01); *B08B 1/002* (2013.01)

(58) Field of Classification Search
CPC .......... A47L 17/00; A47L 13/06; A47L 13/34; A47J 37/0786
USPC ........................................... 15/104.92
See application file for complete search history.

(56) References Cited

U.S. PATENT DOCUMENTS

| | | | | |
|---|---|---|---|---|
| 4,879,779 A | * | 11/1989 | Zalevsky | A47J 37/0694 15/104.92 |
| 5,035,516 A | * | 7/1991 | Pacheco | A47J 37/0786 134/200 |
| 6,098,229 A | * | 8/2000 | Ward | A46B 11/001 134/186 |

FOREIGN PATENT DOCUMENTS

| | | | | |
|---|---|---|---|---|
| DE | 102015221955 B3 | * | 11/2016 | ............... A47J 37/06 |
| FR | 2684317 A1 | * | 6/1993 | ........... A47J 37/0786 |
| GB | 2365322 A | * | 2/2002 | ........... A47J 37/0786 |

* cited by examiner

*Primary Examiner* — Laura C Guidotti
(74) *Attorney, Agent, or Firm* — Boudwin Intellectual Property; Daniel Boudwin

(57) ABSTRACT

A grate cleaning device. The grate cleaning device is configured to wash grill grates. A pair of panels containing brush members are inserted into a housing. The panels are inserted so that the brush members on each panel face each other when they are inserted into the housing. The housing is liquid proof and configured to receive a liquid for cleaning therein. A grate device such as a grill grate can be inserted into the space between the pair of panels and slid in and out. The brush members act as an abrasive, cleaning debris from a grate such as a grill grate.

7 Claims, 3 Drawing Sheets

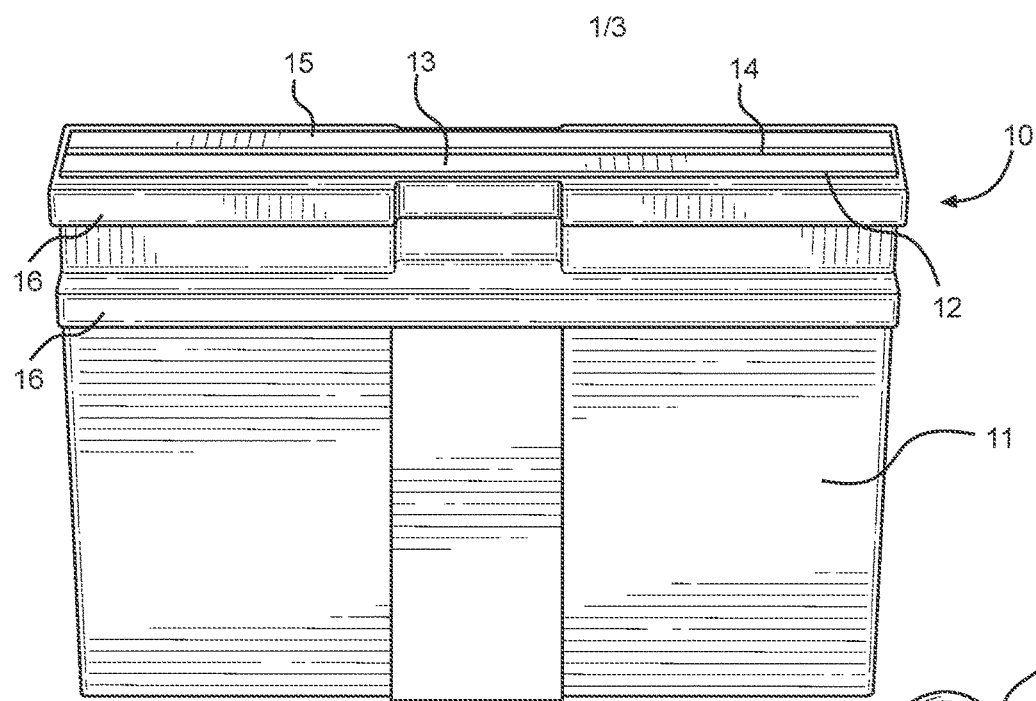
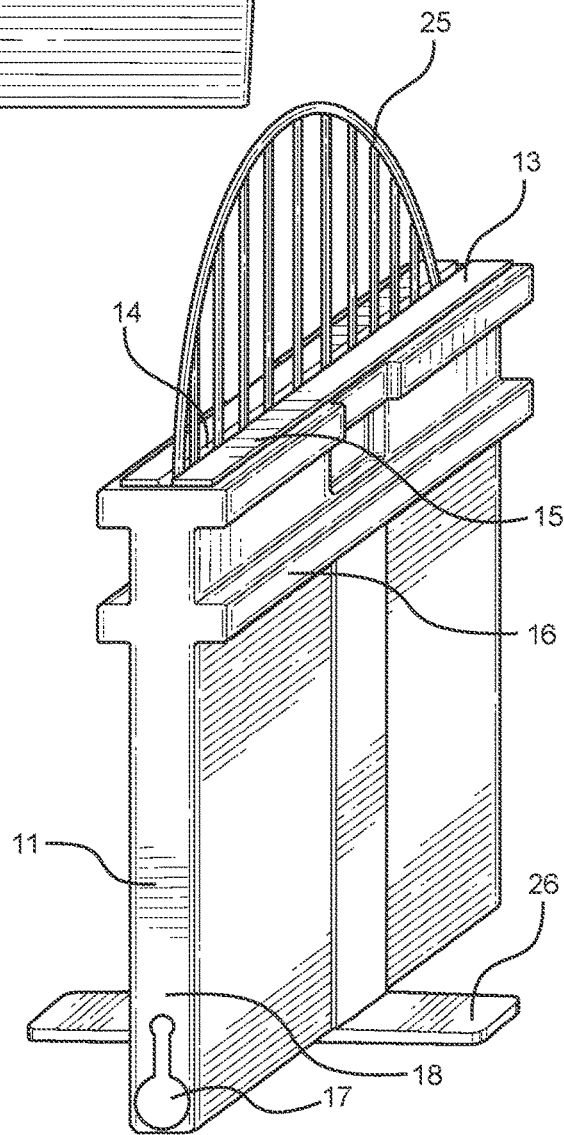
FIG. 1
FIG. 2

GRATE CLEANING DEVICE

CROSS REFERENCE TO RELATED APPLICATIONS

This application claims the benefit of U.S. Provisional Application No. 62/458,081 filed on Feb. 13, 2017. The above identified patent application is herein incorporated by reference in its entirety to provide continuity of disclosure.

BACKGROUND OF THE INVENTION

The present invention relates to a grate cleaning device. Charcoal grills and gas grills are commonly used in food preparation. Like most cooking apparatuses, these grills require cleaning after use to ensure sanitation and safety. Without proper cleaning, mold, decay and rust can form on the grates of the grill. Over time, a lack of proper cleaning may lead to structural deterioration of the grill grates and eventually a complete loss of function thereof. Furthermore, many other cookware devices, such as clean cookie cooling racks, oven racks, the grease vent screens over industrial or residential cook tops may require significant effort to clean.

Currently available methods typically involve using a wire brush or other kind of abrasive surface. The use of these tools, however, can cause more harm than enrichment as many of them, particularly wire brushes, may break off during cleaning. These fragments can not only contaminate the surface of a grill but can also cause injury if they become embedded in food and thereafter consumed. Therefore, there is a need for a portable device that can thoroughly clean a grill grate without leaving particles on the grill grate that could be harmful to users. Furthermore, a device can be additionally utilized to clean cookie cooling racks, oven racks or grease vent screens would be desired.

SUMMARY OF THE INVENTION

In view of the foregoing disadvantages inherent in the known types of grate cleaning devices now present in the known art, the present invention provides a grate cleaning device wherein the same can be utilized for providing convenience for the user when cleaning the grates of a grill.

The present system comprises a housing defining a slot with an open upper end. A pair of panels are configured to be slidably receivable within the slot. Each panel of the pair of panels has an inner face corresponding to the inner face of the opposing panel. A plurality of brush members extend from the inner surface of each panel such that when a grill grate is disposed between the inner surfaces, the plurality of brushes will contact a pair of sides of the grill grate.

It is therefore an object of the present invention to provide a new and improved grate cleaning device that has all of the advantages of the prior art and none of the disadvantages.

Another object of the present invention is to provide a housing that is hinged to enable more efficient access and cleaning of the grate cleaning device.

A further object of the present invention is to provide a hinged housing that further comprises a snap connection to enable more efficient access and secured closure of the grate cleaning device.

Yet another object of the present invention is to provide a valve disposed on a base portion of the housing to enable more efficient drainage of the grate cleaning device.

Still yet another object of the present invention is to provide the pair of panels having a plurality of apertures therethrough to enable more efficient washing of grill grates by the grate cleaning device.

A further option of the present invention is to provide the pair of panels having handle members to enable more ease when moving and removing the pair of panels from the slot.

Yet another object of the present invention is to provide a hole passing through each of the housing and the pair of panels through a point proximal to the open upper end.

Other objects, features and advantages of the present invention will become apparent from the following detailed description taken in conjunction with the accompanying drawings.

BRIEF DESCRIPTION OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

FIG. 1 shows a perspective view of an embodiment of the grate cleaning device.

FIG. 2 shows a perspective view of an embodiment of the grate cleaning device in use.

DETAILED DESCRIPTION OF THE INVENTION

Figure 3:
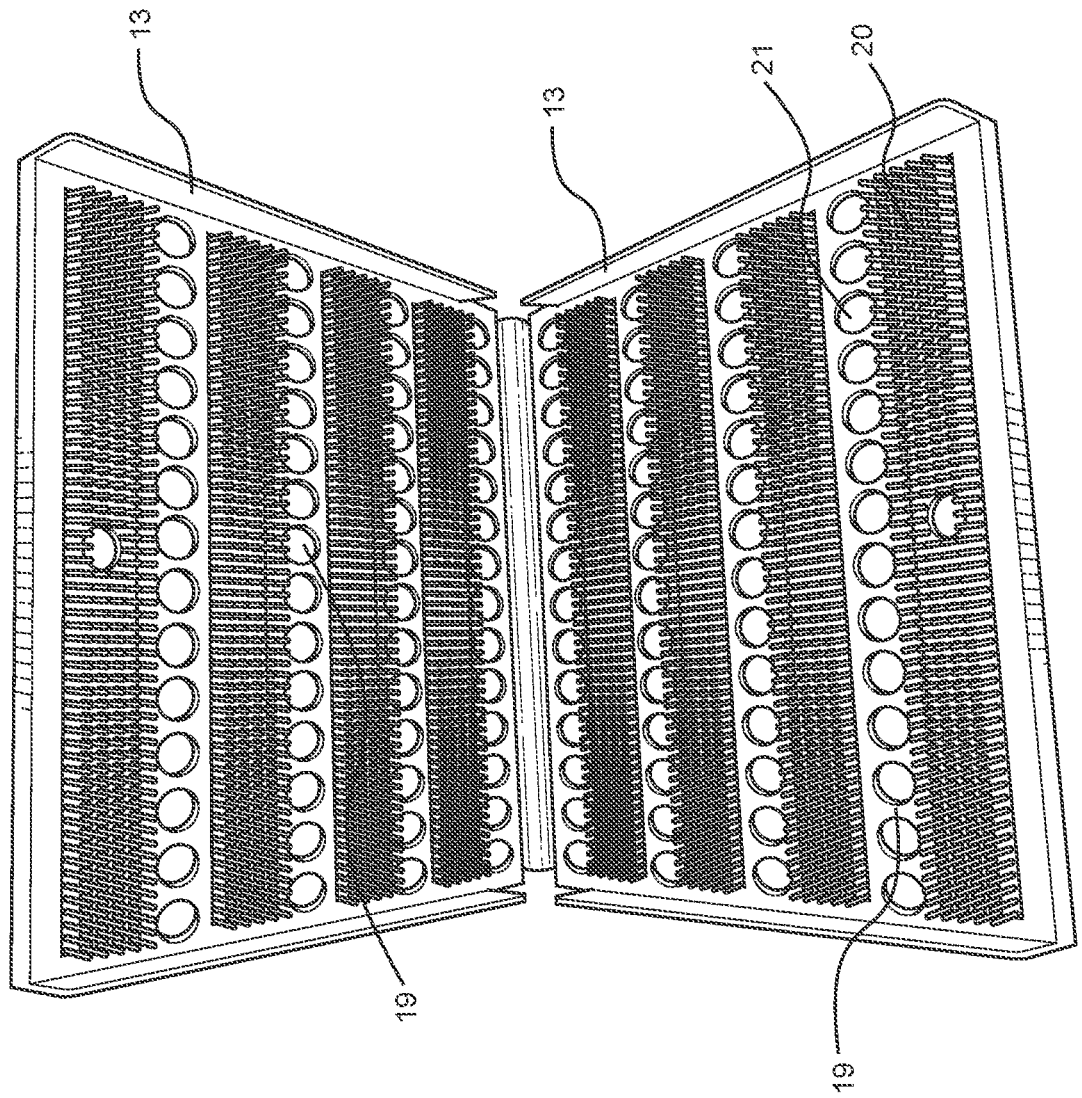
FIG. 3 shows a perspective view of the inner surfaces of the pair of panels of an embodiment of the grate cleaning device.

Reference is made herein to the attached drawings. Like reference numerals are used throughout the drawings to depict like or similar elements of the grate cleaning device. The figures are intended for representative purposes only and should not be considered to be limiting in any respect.

Referring now to FIGS. 1 and 2, there are shown a perspective view of an embodiment of the grate cleaning device and a perspective view of an embodiment of the grate cleaning device in use respectively. The grate cleaning device 10 comprises a housing 11 defining a slot with an open upper end 12. The slot is configured to receive a pair of panels 13 therein through the open upper end 12. When the pair of panels 13 are inserted into the open upper end 12, a gap 14 is created between the pair of panels 13 wherein the gap 14 is configured to receive a cookware device, such as a grill grate, 25 therebetween. In the shown embodiment, the housing 11 has a flat bottom and is configured to rest upon a flat surface for support. In one embodiment, the housing 11 is made from a plastic.

In one embodiment, each panel of the pair of panels 13 further comprises a handle member 15 thereon. The handle member 15 is configured to provide a gripping member by which a user may remove a panel of the pair of panels 13 by gripping the handle member 15 thereof and pulling the handle member 15 away from the housing 11. The pair of handle members 15 are configured to rest above the open upper end 12. Each handle member of the pair of handle members 15 extends in the opposite direction of the opposing handle member. In yet another embodiment, the pair of panels 13 is made from a plastic.

In another embodiment, the housing 11 further comprises a pair of protruding tabs 16 extending a length of the housing between opposing ends, forming a channel therebetween. In this way, allowing for gripping thereof. A recess is formed along at least one of the tabs configured to allow a user to engage an underside of the handle of the received panel for removal thereof.

The housing 11 is configured to hold a liquid, such as water or a liquid cleaning substance therein. The liquid is inserted into the housing 11 to act as a cleaning substance for the grill grate.

In one embodiment, a valve 17 is disposed on a base portion 18 of the housing 11. The base portion 18 is the portion of the housing 11 opposite of the open upper end 12. In yet a further embodiment, the valve 17 is comprised of a plug member configured to insert into an opening in the base portion 18 of the housing 11 such as to form a liquid-tight seal therewith. The valve 17 is configured to enable the user to release the liquid contained in the housing 11 after a cleaning process is conducted. Furthermore, the valve 17 is configured to prevent the growth of mold or mildew in the housing 11 by ensuring sufficient drainage during storage of the grate cleaning device.

In yet another embodiment, the housing 11 comprises a foot step 26 on a base portion thereof. The foot step 26 is configured to enable a user to step thereon and provide additional support to the grate cleaning device 10 during the process of cleaning a cookware device, such as a grill grate 25.

Referring now to FIG. 3, there is shown a perspective view of the inner surfaces of the pair of panels of an embodiment of the grate cleaning device. Each panel of the pair of panels 13 is defined by an outer surface and an inner surface 19. In one embodiment of the pair of panels 13 are hingedly connected. The inner surface 19 of each pair of panels 13 comprises at least one brush member 20. In the shown embodiment, the panels 13 comprise a plurality of brush members 20 that are configured to act as an abrasive upon the grill grate during the cleaning process wherein the grill grate is inserted into the gap and removed from the gap repeatedly. In one embodiment, each brush member of the plurality of brush members 20 is comprised of plastic bristles.

In one embodiment, each panel of the pair of panels 13 comprises a plurality of apertures 21 therethrough. Under this embodiment, the plurality of apertures 21 are disposed on the pair of panels 13 between the brush members 20. The plurality of apertures 21 are configured to enable the liquid to pass therethrough to achieve a cleaning process that is more thorough and efficient. Furthermore, in another embodiment, the plurality of apertures 21 are evenly sized and evenly spaced in rows to ensure a cleaning process that is evenly applied to the grill grate.

Figures 4, 5:
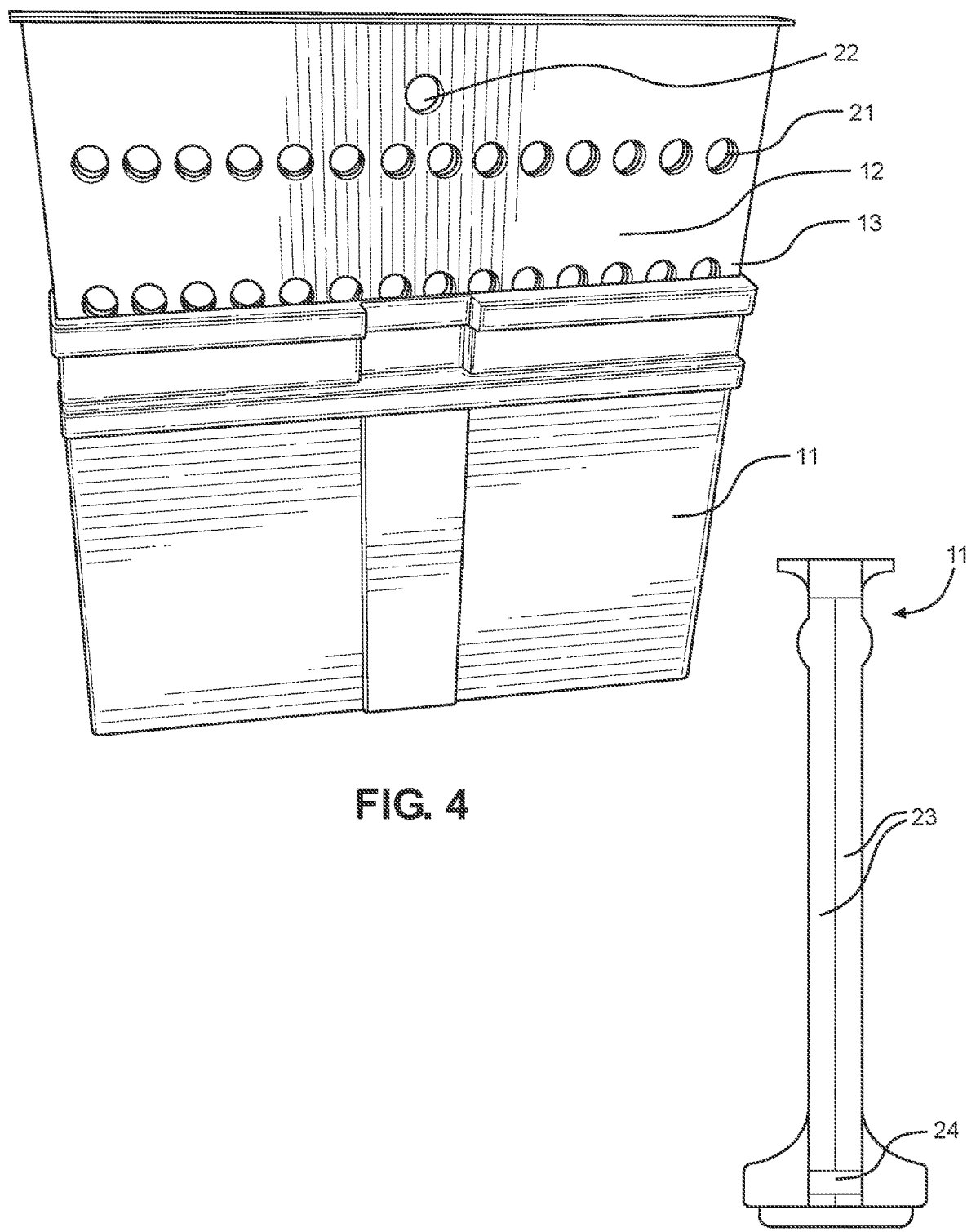
FIG. 4 shows a perspective view of the pair of panels being inserted into an embodiment of the grate cleaning device.
FIG. 5 shows a side view of a housing of an embodiment of the grate cleaning device.

Referring now to FIG. 4, there is shown a perspective view of the pair of panels being inserted into an embodiment of the grate cleaning device. The pair of panels 13 are configured to placed together wherein the inner surface of each is in near contact with the other. Once joined, the pair of panels 13 are configured to slide into the housing 11 through the open upper end 12.

In one embodiment, a pair of holes 22 extend through each panel of the pair of panels 13 through a point proximal to the open upper end. The pair of holes 22 are sized to be larger than each aperture of the plurality of apertures 21. The pair of holes are configured to receive objects therethrough, such as an arm of a hook to allow the pair of panels to dry before storage within the housing 11.

Referring now to FIG. 5, there is shown a side view of an alternate embodiment of the grate cleaning device. In the shown embodiment, the housing 11 is comprised of a pair of opposing members 23. Under this embodiment, the pair of opposing members are attached at the base portion thereof to each other by a hinge 24. Further under this embodiment, the opposing members 23 comprise a snap connection when engaged with each other. The snap connection is further configured to form a liquid-tight seal therebetween so as to ensure the liquid-tight character of the grate cleaning device. In one embodiment, a watertight seal is formed by the connection of a fastener through the pair of opposing members 23 wherein a seal is disposed in between.

A method for using the device exists wherein the housing is filled with water and/or cleaning solution. The grill grate is inserted into the gap wherein the plurality of brush members is configured to act as an abrasive surface. The grill grate is then slid into and out of the gap so as to encourage the brush members to scrape particulate matter from the surfaces thereof.

It is therefore submitted that the instant invention has been shown and described in various embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A grate cleaning device, comprising:
    a housing defining a slot, the slot configured to receive a panel through an open upper end of the housing;
    the panel having an inner face, the inner face including a plurality of brush members configured to engage a grill grate when received in the housing;
    a handle of the panel disposed on a first end, wherein the handle remains exterior the housing when the panel is received within the slot;
    a valve disposed on the housing configured to control fluid communication between an interior and an exterior of the housing;
    wherein the inner face comprising a plurality of apertures configured to provide for fluid communication within the housing;
    wherein the inner face comprises alternating rows of the plurality of apertures and the plurality of brush members between the first end and a second end.

2. The grate cleaning device of claim 1, wherein the panel includes a spacing member extending from perimeter thereof, the spacing member sized to form a gap to receive the grill grate.

3. The grate cleaning device of claim 1, wherein the housing comprises a pair of opposing members hingedly attached at a base portion opposite of the open upper end.

4. The grate cleaning device of claim 3, wherein the housing further comprises a snap connection configured to connect the pair of opposing members.

5. The grate cleaning device of claim 1, wherein:
   the panel comprises a pair of panel members dimensioned to form a gap between the inner faces thereof, wherein the inner faces of the pair of panel members are oriented towards each other;
   the gap dimensioned to receive the grill grate.

6. The grate cleaning device of claim 5, wherein the pair of panel members are hingedly affixed at a second end.

7. The grate cleaning device of claim 1, wherein a foot step is disposed on a base portion of the housing.

\* \* \* \* \*